April 18, 1961 F. F. HARRIS 2,980,143
PIPE CLAMP
Filed May 28, 1959
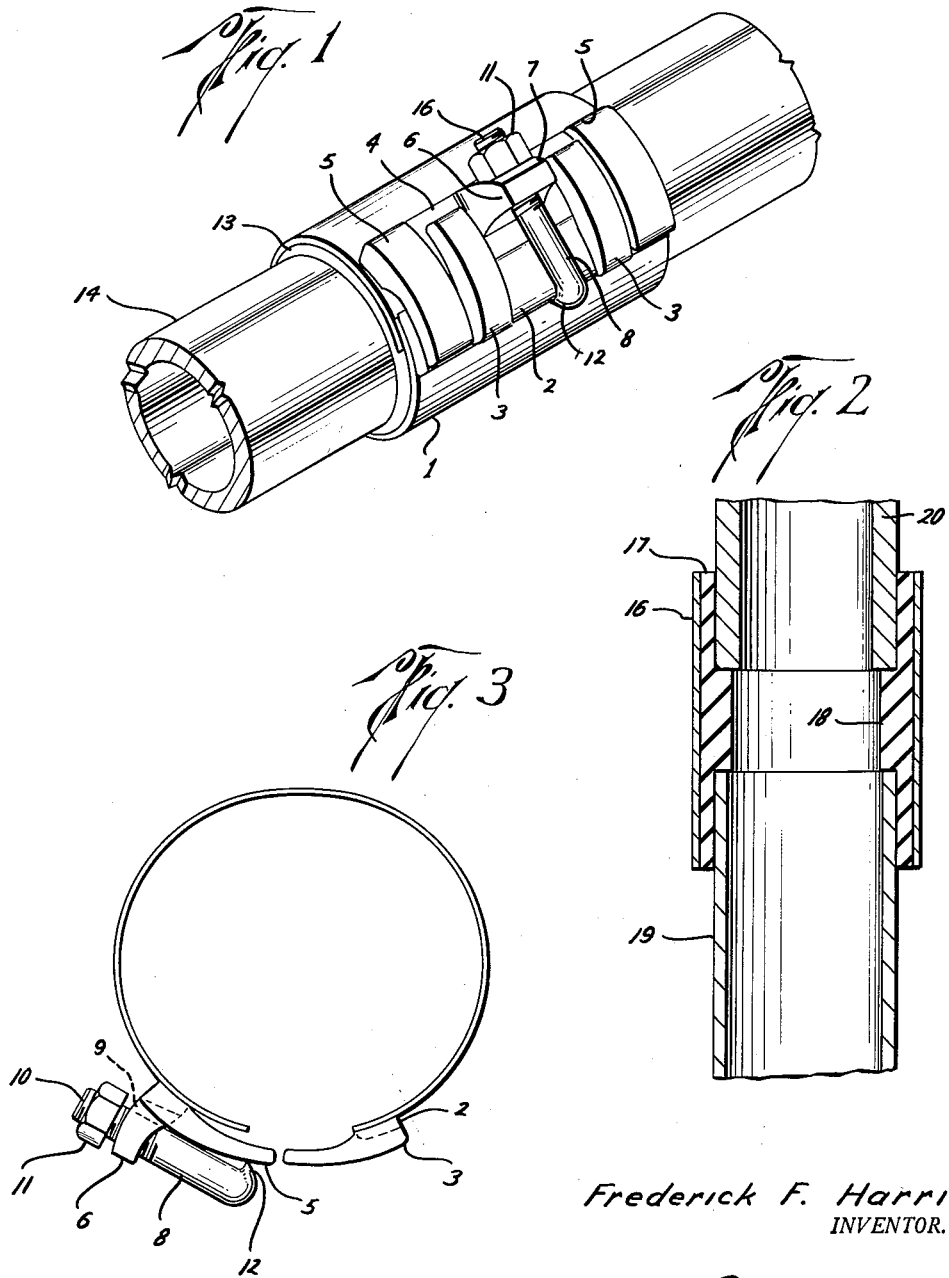
Frederick F. Harris
INVENTOR.
BY Pamela O Wyatt
ATTORNEY United States Patent Office 2,980,143
Patented Apr. 18, 1961

2,980,143
PIPE CLAMP
Frederick F. Harris, Houston, Tex.
(2837 NW. 22nd St., Oklahoma City, Okla.)
Filed May 28, 1959, Ser. No. 816,484
4 Claims. (Cl. 138—99)

This invention relates to new and useful improvements in a pipe clamp.

It is an object of this invention to provide a clamp for tubular goods that may be quickly and easily applied to a tubular article to repair leaks without the necessity of first discontinuing the flow of fluid through the tube.

It is another object of the invention to provide a pipe clamp having novel means for locking the clamp in position on a pipe.

It is still another object of the invention to provide a pipe clamp having an insert of flexible material with an inside radial flange for joining two sections of pipe of varied sizes.

It is still a further object of the invention to provide a pipe clamp for joining the ends of two sections of pipe and protecting the pipe line so formed from electrolysis.

With the above and other objects in view, the invention has relation to certain novel features of construction, operation and arrangement of parts more particularly defined in the following specifications, illustrated in the accompanying drawings, wherein:

Figure 1 is a perspective view of the clamp as applied to a section of tubing.

Figure 2 is a cross sectional elevational view of the clamp illustrating the form of flexible insert employed in joining sections of tubing of various sizes, and Figure 3 is an end view of the clamp in open position.

Referring now more particularly to the drawings, the numeral 1 designates a band of thin sheet metal, such as steel, which is bent to form a cylinder. On one longitudinal margin of the band 1 is the bar 2 having the guide fingers 3, 3 which extend beyond the longitudinal margin of the band 1. Adjacent the other longitudinal margin of the band 1 is the bar 4 having the guide fingers 5, 5 which extend beyond the longitudinal margin of the band 1. The inside longitudinal surface of the fingers 3, 5 are curved to conform to the radius of the tubing on which the clamp is to be mounted. Upstanding on and integral with the bar 4 is the projection 6 having the vertical surface 7 curved for a purpose to be hereinafter defined. A vertical slot 9 is formed in the projection 6 and the locking arm 8 is freely mounted in this slot 9. The arm 8 has one end externally threaded as at 10 and a nut as 11 is mounted on the threaded end. The other end of the arm 8 has the inwardly extending hook 12.

When using the clamp to repair a leak in a tube, such as a water pipe 14, the band 1 is placed on the tube by spreading the longitudinal margins to place the band around the tube. A flexible insert, such as the rubber strip 13, is loosely mounted in the band 1 and is of the same surface dimensions as the band 1. The band, with the insert, is then positioned over the leak in the tube and the locking arm 8 extended over the bar 2 until the hook 12 engages the outer margin of the bar 2. The nut 11 is then rotated until the clamp is in position to seal the leak. The curved surface 7 of the projection 6 permits the arm 8 to engage the bar 2 and direct a pulling action thereon following the radius of the tube. The fingers 3, 3 and 5, 5 guide the longitudinal margins of the band 1 and maintain the said margins in alignment to effect an even sealing action over the entire contacting surface of the band 1 against the insert 13 and the tube 14.

One locking arm only, and four guide fingers are shown in the drawings, however, it is contemplated that as many sets of locking arms and fingers as may be desired may be employed where longer clamps are desired.

In the form shown in Figure 2, the band 16 is exactly the same as the band 1, and all of the other elements of band 1, such as the locking arm and guide fingers are the same as shown in Figure 1. The flexible and yieldable insert 17, however, has a radial boss 18 so that the ends of two sections of tubing may be joined, providing a guard against electrolysis. The insert 17 may be formed of rubber, or other suitable non-conductive material, and being yieldable, will hold the ends of the two sections of tubing in joined relation, even though the sections be of different sizes, as the tubing sections 19, 20, which is often encountered, such as when joining plastic tubing with metal tubing.

While the foregoing are considered preferred forms of the invention, it is by way of illustration only, the broad principle of the invention being defined by the appended claims.

What I claim is:

1. In a pipe clamp, a steel band bent to conform with the shape of a tube, a yieldable insert loosely mounted in said band, a bar mounted on the outside surface of one longitudinal margin of said band and guide fingers mounted on said bar and extending longitudinally beyond said longitudinal margin of said band, a bar mounted adjacent the other longitudinal margin of said band, guide fingers on said last mentioned bar extending longitudinally beyond said longitudinal margin of said band, said fingers on said bars maintaining the ends of said band in longitudinal alignment and a locking arm on said last mentioned bar having a hook at one end positioned to engage the outer margin of the first mentioned bar.

2. In a pipe clamp, a steel band bent to conform with the shape of a tube, a yieldable insert loosely mounted in said band, a bar mounted on the outside surface of one longitudinal margin of said band and guide fingers mounted on said bar and extending longitudinally beyond said longitudinal margin of said band, a bar mounted adjacent the other longitudinal margin of said band, guide fingers on said last mentioned bar extending longitudinally beyond said longitudinal margin of said band, said fingers on said bars maintaining the ends of said band in longitudinal alignment and a locking arm on said last mentioned bar having a hook at one end positioned to engage the outer margin of the first mentioned bar, means on said arm for drawing the said bars towards each other.

3. In a clamp, a band formed of a metallic strip having a rigid bar mounted at one end and a rigid bar mounted adjacent the other end, longitudinally extended parallel, interlocking fingers on said bars movable into aligning engagement and overlapping the respective ends of the strip, a projection on one of said bars having a vertical slot therein, a locking arm having one end threaded and mounted in said slot, and the other end of said arm having a hook for engagement with the outer edge of the opposing bar and a nut on the threaded end of said arm for drawing the ends of said band tightly together.

4. In a pipe clamp, a band formed of a metallic strip having a rigid bar mounted at one end and a rigid bar mounted adjacent the other end, longitudinally extended fingers on said bars movable into aligning engagement overlapping the respective ends of the strip, a projection on one of said bars having a vertical slot therein, a locking arm having one end threaded and mounted in said slot, and the other end of said arm having a hook for engagement with the outer edge of the opposing bar and a nut on said threaded end of said arm for drawing the ends of said band tightly together, said projection being curved to permit the locking arm to follow the radius of the pipe being clamped.

References Cited in the file of this patent

UNITED STATES PATENTS

| | | |
|---|---|---|
| 118,868 | McClelland | Sept. 12, 1871 |
| 396,625 | Thum | Jan. 22, 1889 |
| 1,806,867 | Welsh | May 26, 1931 |
| 1,816,197 | Ruemelin | July 28, 1931 |
| 2,690,193 | Smith | Sept. 28, 1954 |

FOREIGN PATENTS

| | | |
|---|---|---|
| 21,145 | Great Britain | Nov. 7, 1893 |